(12) United States Patent
Inoue

(10) Patent No.: US 9,200,972 B2
(45) Date of Patent: Dec. 1, 2015

(54) EXTERNAL FORCE JUDGMENT METHOD AND EXTERNAL FORCE JUDGMENT DEVICE OF HUMAN-COLLABORATIVE INDUSTRIAL ROBOT

(71) Applicant: FANUC CORPORATION, Minamitsuru-gun, Yamanashi (JP)

(72) Inventor: Youichi Inoue, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/582,615

(22) Filed: Dec. 24, 2014

(65) Prior Publication Data

US 2015/0177084 A1 Jun. 25, 2015

(30) Foreign Application Priority Data

Dec. 25, 2013 (JP) ................................. 2013-268035

(51) Int. Cl.
| | | |
|---|---|---|
| G01L 1/00 | (2006.01) | |
| G01L 1/16 | (2006.01) | |
| G01L 1/14 | (2006.01) | |
| G01L 5/00 | (2006.01) | |
| G01L 19/14 | (2006.01) | |
| G01L 5/18 | (2006.01) | |

(52) U.S. Cl.
CPC ................. G01L 5/0028 (2013.01); G01L 5/18 (2013.01)

(58) Field of Classification Search
CPC .......................................................... G01L 1/00
USPC ....................................................... 73/862.541
See application file for complete search history.

(56) References Cited

U.S. PATENT DOCUMENTS

| | | | |
|---|---|---|---|
| 2012/0144932 A1* | 6/2012 | Ikebe et al. | ............... 73/862.041 |
| 2013/0211739 A1 | 8/2013 | Nitz et al. | |
| 2015/0174771 A1* | 6/2015 | Fujita | ............................ 700/258 |

FOREIGN PATENT DOCUMENTS

| | | |
|---|---|---|
| JP | 7-51996 A | 2/1995 |
| JP | 2003-39376 A | 2/2003 |
| JP | 2003-305669 A | 10/2003 |
| JP | 2010-228028 A | 10/2010 |
| JP | 2010-269412 A | 12/2010 |
| JP | 2013-198955 A | 10/2013 |
| JP | 2013-223921 A | 10/2013 |

* cited by examiner

*Primary Examiner* — Lisa Caputo
*Assistant Examiner* — Jamel Williams
(74) *Attorney, Agent, or Firm* — Hauptman Ham, LLP

(57) ABSTRACT

An external force judgment method including a reference value acquisition step of acquiring a reference value of a relative position or angle of a second member with respect to a first member when a robot on which no external force is acting or on which a known external force is acting is assumed to be operated by a predetermined command in advance; a measured value acquisition step of acquiring a measured value of a relative position or angle of the second member with respect to the first member when the robot is operated by the predetermined command; and a judgment step of judging the presence or absence of an external force acting on the robot based on a difference between the reference value and the measured value and a predetermined threshold value.

8 Claims, 7 Drawing Sheets

EXTERNAL FORCE JUDGMENT METHOD AND EXTERNAL FORCE JUDGMENT DEVICE OF HUMAN-COLLABORATIVE INDUSTRIAL ROBOT

RELATED APPLICATIONS

The present application claims priority to Japanese Application Number 2013-268035, filed Dec. 25, 2013, the disclosure of which is hereby incorporated by reference herein in its entirety.

BACKGROUND OF THE INVENTION

1. Field of the Invention

The present invention relates to an external force judgment method and an external force judgment device of a human-collaborative industrial robot.

2. Description of the Related Art

In the case of a human-collaborative industrial robot working in collaboration with a human worker, the worker and the robot may come close to each other during work and may mistakenly come in contact with each other. If such a contact occurs, immediate detection of the contact and then implements of safety measures such as stop of the robot are needed. A contact between a worker and a robot can be detected by judging the presence or absence of an external force acting on the robot. With this regard, for example, U.S. Laid-open Patent Publication No. 2013/0211739 (US2013/0211739A1) discloses a method for estimating a torque acting on an arm of a robot in which the arm is driven by a motor through a decelerator. Specifically, in US2013/0211739A1, a rotation angle of the motor and a rotation angle of an output shaft of the decelerator, respectively, are detected, and based on a difference between the two rotation angles, the torque is estimated.

However, the torque of a decelerator has characteristics in which it changes nonlinearly with respect to changes in the rotation angles due to backlash, friction, hysteresis, or the like. Accordingly, if a torque is estimated based on a difference between the rotation angle of a motor and the rotation angle of an output shaft of a decelerator, as described in US2013/0211739A1, it is not possible to judge the presence or absence of an external force acting on a robot with high precision.

SUMMARY OF THE INVENTION

According to an aspect of the present invention, there is provided an external force judgment method for judging a presence or absence of an external force acting on a robot including a first member and a second member movably connected to the first member through a deceleration mechanism, the method including: a reference value acquisition step of acquiring a reference value of a relative position or angle of the second member with respect to the first member when the robot on which no external force is acting or on which a known external force is acting is assumed to be operated or is operated by a predetermined command in advance; a measured value acquisition step of acquiring a measured value of a relative position or angle of the second member with respect to the first member when the robot is operated by the predetermined command, in which one of a detection unit and a detected unit paired with the detection unit is arranged on the first member or a part that does not relatively move with respect to the first member, whereas another of the detection unit and the detected unit is arranged on the second member or a part that does not move with respect to the second member, and a value detected by the detection unit is the measured value; and a judgment step of judging the presence or absence of an external force acting on the robot based on a difference between the reference value acquired by the reference value acquisition step and the measured value acquired by the measured value acquisition step and a predetermined threshold value.

According to another aspect of the present invention, there is provided an external force judgment device for judging the presence or absence of an external force acting on a robot including a first member and a second member movably connected to the first member through a deceleration mechanism, the device including a reference value acquisition unit for acquiring a reference value of a relative position or angle of the second member with respect to the first member when the robot on which no external force is acting or on which a known external force is acting is assumed to be operated or is operated by a predetermined command in advance; a measured value acquisition unit for acquiring a measured value of the relative position or angle of the second member with respect to the first member when the robot is operated at the predetermined command, the measured value acquisition unit including a detection unit and a detected unit paired with the detection unit, in which one of the detection unit and the detected unit is arranged on the first member or a part that does not relatively move with respect to the first member, whereas another of detection unit and the detected unit is arranged on the second member or a part that does not move with respect to the second member, and a value detected by the detection unit is the measured value; and a judgment unit for judging the presence or absence of an external force acting on the robot based on a difference between the reference value acquired by the reference value acquisition unit and the measured value acquired by the measured value acquisition unit and a predetermined threshold value.

BRIEF DESCRIPTION OF THE DRAWINGS

The foregoing and other objects, features, and advantages of the invention will be more apparent from the following description of preferred embodiments taken in conjunction with the accompanying drawings in which.

DETAILED DESCRIPTION

First Embodiment

Hereinafter, a description will be given of an external force judgment method of a human-collaborative industrial robot according to a first embodiment of the present invention with reference to FIGS. 1 to 7. The human-collaborative industrial robot refers to an industrial robot working in collaboration with a human worker or working while sharing a work space with a human worker. Typical industrial robots carry out their work in an area surrounded by a safe fence where entry is restricted, so that the safety of workers can be ensured. On the other hand, in the case of a human-collaborative industrial robot, a worker may enter a work area for the robot to carry out work and thus the robot may happen to contact with the worker, an obstacle, or the like during work. Accordingly, it is necessary to early detect such a contact with the robot and then implement safety measures such as stop of operation of the robot upon detection of the contact.

Figure 1:
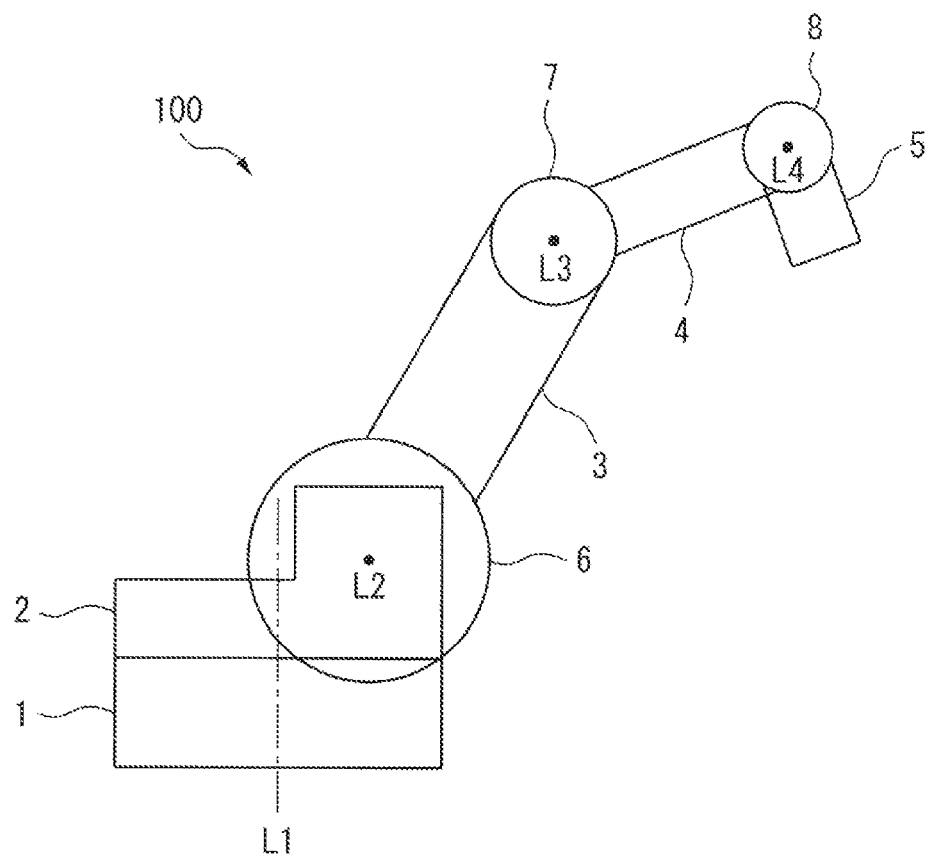
FIG. 1 is a side view illustrating a schematic structure of a human-collaborative industrial robot according to a first embodiment of the present invention.

FIG. 1 is a side view illustrating a schematic structure of a human-collaborative industrial robot 100 according to a first embodiment of the present invention. The robot 100 includes a base unit 1, a pivoting unit 2, a lower arm 3, an upper arm 4, and a wrist unit 5.

The pivoting unit 2 is pivotably supported above the base unit 1 through a pivoting mechanism around an axial line L1 extending in a vertical direction. The lower arm 3 is rotatably supported to the pivoting unit 2 through a joint unit 6 around an axial line L2 extending in a horizontal direction. The upper arm 4 is rotatably supported to a tip portion of the lower arm 3 through a joint unit 7 around an axial line L3 extending in the horizontal direction. The wrist unit 5 is rotatably provided at a tip portion of the upper arm 4 through a joint unit 8 around an axial line L4 extending in the horizontal direction. The pivoting unit 2 and the joint units 6 to 8 are driven by servo motors.

Figure 2:
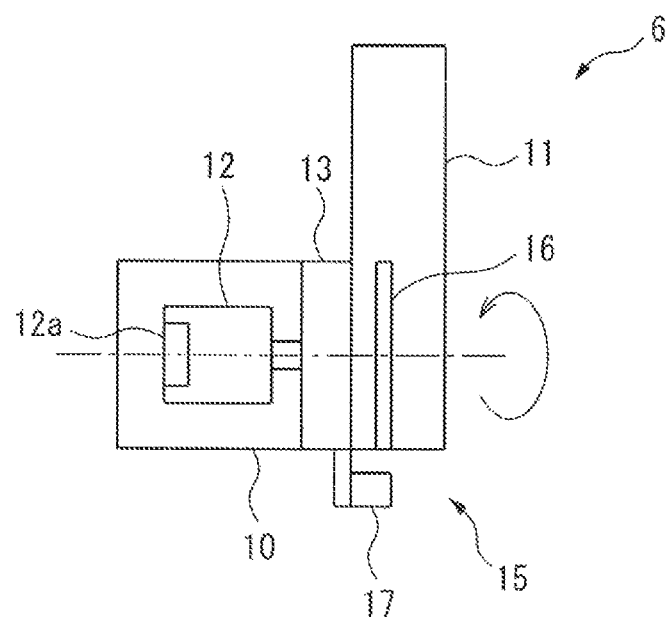
FIG. 2 is a diagram illustrating a structure of a joint unit of FIG. 1.

FIG. 2 is a diagram illustrating a structure of the joint unit 6. As depicted in FIG. 2, the joint unit 6 includes a fixed unit 10 fixed to the pivoting unit 2 and a rotation unit 11 fixed to the lower arm 3 and relatively rotating with respect to the fixed unit 10. A servo motor 12 and an outside casing of a deceleration mechanism 13 are integrally provided on the fixed unit 10. The servo motor 12 incorporates an encoder 12a, and the encoder 12a detects a rotation angle of the servo motor 12. The deceleration mechanism 13 includes an input shaft, an output shaft, and a plurality of gears and decelerates a rotation input from the servo motor 12 to increase a torque and transmit to the rotation unit 11. The servo motor 12 and the deceleration mechanism 13 may be provided on the rotation unit 11. In this case, the deceleration mechanism 13 decelerates a rotation input from the servo motor 12 to increase a torque and transmit to the fixed unit 10. One of the servo motor 12 and the deceleration mechanism 13 may be provided on the fixed unit 10, whereas the other one thereof may be provided on the rotation unit 11.

Furthermore, an angle detection unit 15 for detecting a relative angle of the lower arm 3 with respect to the pivoting unit 2 (hereinafter referred to as "arm angle") is provided on an output side of the deceleration mechanism 13 at the joint unit 6. With this arrangement, the angle detection unit 15 directly detects an arm angle of the lower arm 3 influenced by nonlinear characteristics of the deceleration mechanism 13. Accordingly, even when the nonlinear characteristics of the deceleration mechanism 13 and the degree of influence of the characteristics are unknown, it is possible to accurately determine a relative angle at which the lower arm 3 is actually positioned with respect to the pivoting unit 2. The angle detection unit 15 includes a detected unit and a detection unit. The detected unit is composed of a scale 16 provided on a circumferential surface of the rotation unit 11, and the detection unit is composed of a detection head 17 provided on the fixed unit 10 (the outer casing of the deceleration mechanism 13) in such a manner as to face the scale 16. Scale marks are formed on the scale 16 at a narrow pitch. The detection head 17 applies a laser beam to the scale 16, receives reflection light reflected on the scale 16, and detects an arm angle based on a strength or weakness of the light.

The scale marks of the scale 16 are provided, for example, at an equal interval. The arm angle detected in this case corresponds to an amount of change in arm angle, i.e., a relative value. Depending on the specifications of the scale 16, it is possible to directly detect an arm angle itself, i.e., an absolute value of the arm angle. In FIG. 2, the detection head 17 is provided on the fixed unit 10 (the outside casing of the deceleration mechanism 13). However, the detection head 17 may be provided on another place as long as it is a part that does not relatively move (rotate) with respect to the fixed unit 10. In addition, although the scale 16 is provided on the rotation unit 11, the scale 16 may be provided on another place as long as it is a part that does not relatively move (rotate) with respect to the rotation unit 11. In contrast with FIG. 2, the scale 16 may be provided on the fixed unit 10 or a part that does not relatively move with respect to the fixed unit 10, and the detection head 17 may be provided on the rotation unit 11 or a part that does not relatively move with respect to the rotation unit 11. In other words, the scale 16 and the detection head 17 can be arranged at positions different from those in FIG. 2 as long as one of the scale 16 and the detection head 17 is arranged on the fixed unit 10 or a part that does not move with respect to the fixed unit 10 and the other scale 16 and the detection head 17 is arranged on the rotation unit 11 or a part that does not relatively move with respect to the rotation unit 11.

The outside casing of the deceleration mechanism 13 may be fixed not to the fixed unit 10 but to the rotation unit 11. In this case also, it is sufficient to arrange one of the scale 16 and the detection head 17 on the fixed unit 10 or a part that does not relatively move with respect to the fixed unit 10 and arrange the other scale 16 and the detection head 17 on the rotation unit 11 or a part that does not relatively move with respect to the rotation unit 11. Additionally, when the outside casing of the deceleration mechanism 13 is fixed to the fixed unit 10, the part that does not relatively move with respect to the rotation unit 11 includes the output shaft of the deceleration mechanism 13, whereas when the outside casing of the deceleration mechanism 13 is fixed to the rotation unit 11, the part that does not relatively move with respect to the fixed unit 10 includes the output shaft of the deceleration mechanism 13. The deceleration mechanism 13 and the angle detection unit 15 may be provided also on the pivoting mechanism and the other joint units 7 and 8, similarly to the joint unit 6.

Figure 3:
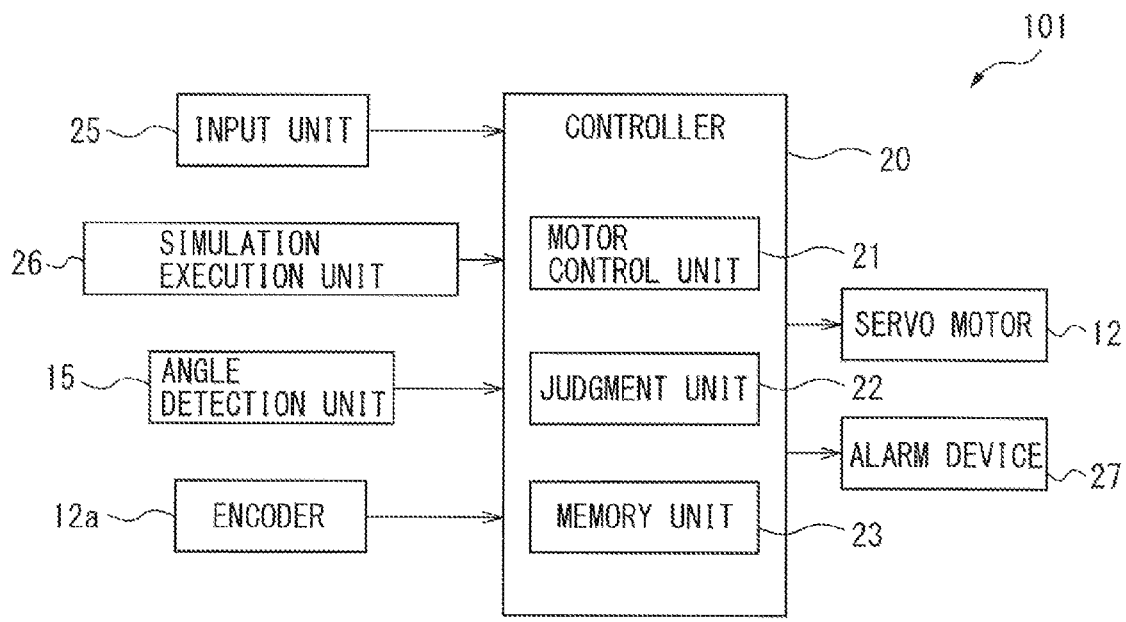
FIG. 3 is a block diagram illustrating a configuration of an external force judgment device according to the first embodiment of the invention.

FIG. 3 is a block diagram illustrating a configuration of an external force judgment device 101 according to the first embodiment of the present invention. The external force judgment device 101 includes a controller 20 as a robot control device playing a central role. The controller 20 includes a calculation processing device including a CPU, a ROM, a RAM, and other peripheral circuits. The controller 20 has a functional structure including a motor control unit 21, a judgment unit 22, and a memory unit 23. The controller 20 is connected to an input unit 25 for inputting various commands relating to the judgment of an external force, a simulation execution unit 26 for executing an operational simulation of the robot in advance, an angle detection unit 15, an encoder 12a, a servo motor 12, and an alarm device 27. The servo motor 12 includes a plurality of servo motors provided on the pivoting mechanism and the respective joint units 6 to 8.

The memory unit 23 stores a control program Pr for controlling operation of the robot 100 during work, in advance. The controller 20 may be allowed to read the control program Pr from an external device. The input unit 25 inputs an operation start command for the robot 100 and the like.

The simulation execution unit 26 executes an operational simulation by using a robot model corresponding to the robot 100. In other words, the simulation execution unit 26 causes the robot model to be operated through a computer according to the same control program Pr as that during operation of the robot, and calculates an arm angle from a posture of the robot model. The robot model used for the simulation calculation corresponds to the robot 100 on which no external force is acting or on which a known external force is acting. Therefore, the arm angle calculated by the simulation execution unit 26 is an arm angle to be a reference for judging whether or not an external force is acting on the robot 100, i.e., a reference value (theoretical value) a of arm angle. The simulation execution unit 26 acquires time-series data of the reference value α. The time-series data is stored in the memory unit 23 of the controller 20.

Alternatively, the simulation execution unit 26 may be incorporated in the controller 20. Then, the controller 20 may execute a simulation calculation and store a calculated reference value α in the memory unit 23. A robot model used for simulation calculation by the simulation execution unit 26 can be created using an arm angle calculated considering nonlinear characteristics of the deceleration mechanism 13 found based on a value detected by the angle detection unit 15 in operation of the robot 100 performed in advance. Alternatively, it is also possible to create a robot model using an arm angle calculated by adding the nonlinear characteristics of the deceleration mechanism 13 to an angle value detected by the encoder 12a. In this case, the reference value (theoretical arm angle value) α of arm angle obtained by the simulation execution unit 26 becomes a value close to an actual arm angle of the robot 100. This corresponds to an arm angle when it is assumed that one of the detection unit and the detected unit is arranged on the pivoting unit 2 or a part that does not relatively move with respect to the pivoting unit 2, whereas the other detection unit and the detected unit is arranged on the lower arm 3 or a part that does not relatively move with respect to the lower arm 3.

In this way, considering the nonlinear characteristics of the deceleration mechanism 13 allows the reference value α to be obtained with high precision. This can reduce the magnitude of a threshold value (a predetermined value γs described later) as a reference for judging the presence or absence of an external force acting on the robot 100, thus allowing high precision judgment of the presence or absence of an external force. On the other hand, it is also possible to create a robot model without considering nonlinear characteristics of the deceleration mechanism 13 to calculate an arm angle. In this case, calculation precision for the reference value α is degraded. Therefore, the magnitude of the threshold value needs to be increased in order to avoid erroneous detection in the judgment of an external force. However, calculation time can be shortened due to no consideration for the linear characteristics. In addition, there is no need to specify nonlinear characteristics, which are generally difficult to identify, thus facilitating external force judgment.

The motor control unit 21 outputs a control signal to each of the servo motors 12 of the robot 100 according to the control program Pr to operate the robot 100. At this time, each servo motor 12 is feedback controlled based on a signal from the encoder 12a. When the robot 100 is operated, the angle detection unit 15 detects a measured value β of arm angle. The motor control unit 21 starts processing when the input unit 25 inputs an operation start command for the robot 100.

The judgment unit 22 calculates a difference γ between the measured value β of arm angle detected during the operation of the robot 100 and the reference value α of arm angle stored in advance in the memory 23. In other words, the judgment unit 22 calculates a difference γ between a reference value α corresponding to a certain operation command of the control program Pr and a measured value β detected when the same operation command as the above command is output. In addition, the judgment unit 22 judges whether the difference γ (an absolute value) is larger than a predetermined value γs or not. In other words, the judgment unit 22 serves not only as the judgment function but also as a calculation unit for calculating the difference γ. When some predetermined values γs are set in advance and a predetermined value γs is selected or calculated from the set values according to operational conditions and ambient environment of the robot 100, the judgment unit 22 may be able to have a function of selecting or calculating the predetermined value γs. In addition, considering that there is a time lag between the output of the operation command and the actual operation of the robot 100, timing for comparison of the reference value a may be shifted by the time lag.

The predetermined value γs is a threshold value for judging the presence or absence of an external force acting on the robot 100. In consideration of the amount of variation (resolution) in the angle detection unit 15, the predetermined value γs is set to be larger than the amount of variation. When no external force is acting on the robot 100, the value γ is equal to or less than the predetermined value γs. On the other hand, when an external force acts on the robot 100 due to a contact of a worker or an obstacle with the robot 100 (the lower arm 3 or the like), the value γ becomes more than the predetermined value γs. Accordingly, comparing the magnitudes of the value γ and the predetermined value γs allows judgment as to whether external force is acting on the robot 100.

When the judgment unit 22 judged that γ is larger than γs (γ>γs), preferably, the motor control unit 21 outputs a stop signal to the servo motor 12 to stop the operation of the robot 100. Alternatively, the motor control unit 21 may output a control signal allowing the value γ to be equal to or less than the predetermined value γs to the servo motor 12 to reduce the external force acting on the robot 100. At this time, the motor control unit 21 may output a control signal to the alarm device 27 to cause the alarm device 27 to generate an alarm.

Figure 4:
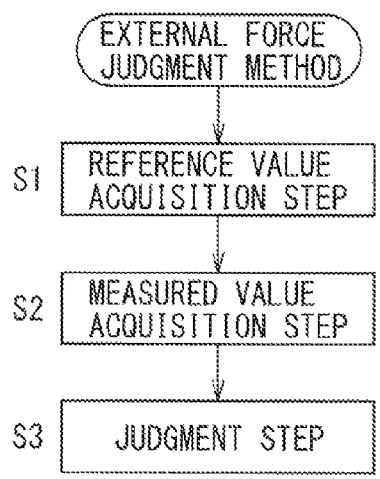
FIG. 4 is a flowchart illustrating an external force judgment method according to the first embodiment of the invention.

FIG. 4 is a flowchart illustrating an external force judgment method according to the first embodiment of the present invention. First, at a step S1, the simulation execution unit 26 executes a simulation calculation according to the control program Pr by using a robot model corresponding to the robot 100 on which no external force is acting or on which a known external force is acting to calculate a reference value α of arm angle (a reference value acquisition step).

Next, at a step S2, the angle detection unit 15 detects a measured value β of arm angle when the robot 100 is operated according to the control program Pr by a control signal from the motor control unit 21 (a measured value acquisition step).

Then, at a step S3, during the operation of the robot 100 by the control signal from the motor control unit 21, the judgment unit 22 calculates a difference γ between the reference value α of arm angle and the measured value β thereof, and compares the magnitudes of the difference γ and a predetermined value γs to judge the presence or absence of an external force acting on the robot 100 (a judgment step).

Figure 5:
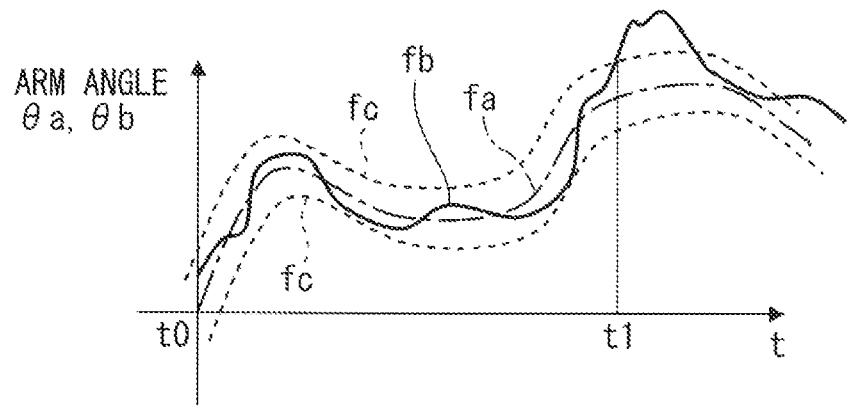
FIG. 5 is a graph illustrating an example of operational characteristics obtained by the external force judgment method according to the first embodiment of the invention.

FIG. 5 is a graph illustrating an example of operational characteristics obtained by the external force judgment method according to the first embodiment of the invention. In the graph, a characteristic fa represents a characteristic of a reference value a acquired by the reference value acquisition step (step S1), and a characteristic fb represents a characteristic of a measured value β acquired by the measured value acquisition step (step S2). In addition, characteristics fc represent characteristics of threshold values obtained by shifting the characteristic fa to the positive side and the negative side respectively by a predetermined value γs. The characteristics fa and fc represent calculated theoretical values and thus change gently, whereas the characteristic fb represents measured values and thus change due to noise, vibration, or the like.

As illustrated in FIG. 5, during a period of time from time point t0 to time point t1, the difference γ between the reference value α and the measured value β is equal to or less than the predetermined value γs, and the characteristic fb is positioned within the pair of characteristics fc. For example, when, at the time point t1, a worker contacts with the lower arm 3 and thereby an external force acts on the lower arm 3, the value γ becomes more than the predetermined value γs. As a result, the judgment unit 22 judges that there is an external force acting on the robot 100. After that, since the worker takes evasive action from the robot 100, the value γ becomes equal to or less than the predetermined value γs again. After judging the presence of the external force at the time point t1, the operation of the robot 100 may be forcibly stopped by a command from the motor control unit 21.

Figure 6:
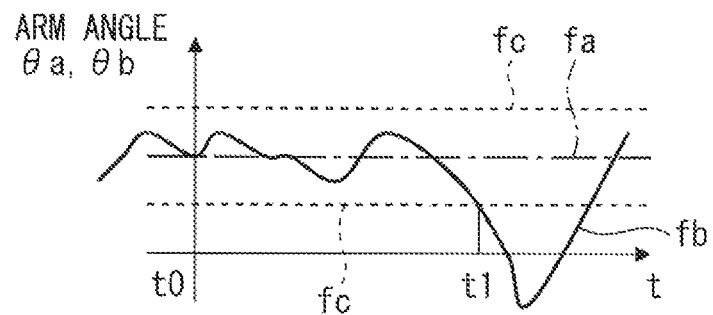
FIG. 6 is a graph illustrating an example of operational characteristics during stop of operation of the robot.

FIG. 6 is a graph illustrating one example of operational characteristics when a stop command has been given from the control program Pr and the operation of the robot 100 has been stopped by a control signal from the motor control unit 21. Therefore, in FIG. 6, the characteristic fa of the reference value α and the characteristics fc of the threshold values are constant. The stop command is a command for stopping and suspending rotation operation of the robot arm during the rotation operation thereof or a command for continuously maintaining the robot 100 in a stationary state as it is. During a transitional period of time from the stop of the rotation operation to the stop of the robot arm, the method described above can be applied and then there is obtained an advantageous effect according to the method.

On the other hand, when continuing the stationary state, an additional advantageous effect is obtained. Specifically, in the stationary state, vibration of the arm occurring during the operation of the robot 100 is reduced, which makes the threshold values much smaller, allowing for high-sensitivity detection of an external force. In addition, the nonlinear characteristics of the deceleration mechanism 13 are also kept in a certain constant state. Thus, when acquiring the reference value α of arm angle in the stationary state, it is unnecessary to always acquire a series of data corresponding to a period of time scheduled to continue the stationary state. As a result, the reference value α can be determined using data corresponding to an appropriate period of time, so that time for acquiring the reference value α can be shortened. Furthermore, when the period of time for continuing the stationary state is changed, it is unnecessary to newly acquire a reference value α. It is enough to shorten or extend a period of time for applying the reference value α depending on the period of time for continuing the stationary state. This can facilitate acquisition of the reference value α. When the stationary position or angle of the robot 100 changes due to the stop command, the reference value α changes due to the nonlinear characteristics of the deceleration mechanism 13. Thus, it is necessary to acquire a new reference value α. However, the acquisition time for the reference value α is short, as described above.

In FIG. 6, during the period of time from the time point t0 to the time point t1, the characteristics fb are positioned within the pair of characteristics fc. For example, when, at the time point t1, the lower arm 3 contacts with a worker and thereby the value γ exceeds the predetermined value γs, the judgment unit 22 judges that there is an external force acting on the robot 100. After that, the motor control unit 21 outputs, to the servo motor 12, a control signal that reduces the external force, for example, a control signal that causes the lower arm 3 in contact with the worker to move away from the worker. As a result, the value γ becomes equal to or less than the predetermined value γs. In this way, when the presence or absence of an external force is judged during the stop of operation of the robot 100 and then it is judged that there is an external force, the robot 100 is controlled such that the external force is reduced, whereby, for example, even when it is difficult for the worker to evade from the robot 100, safety can be ensured.

In the above embodiment, the reference value α of arm angle is obtained in advance by calculation. However, the reference value α may be obtained on an assumption of an ideal robot 100 in which there is no variations in machining and assembly or in consideration of variations therein. The reference value α may be obtained considering that body expansion of the robot 100, change in the detection value of the angle detection unit 15, or the like occurs depending on the ambient temperature at which the robot 100 is used. When considering the variations in machining and assembly, the influence of the ambient temperature, and the like, characteristics fa of a plurality of reference values a may be set.

Figure 7:
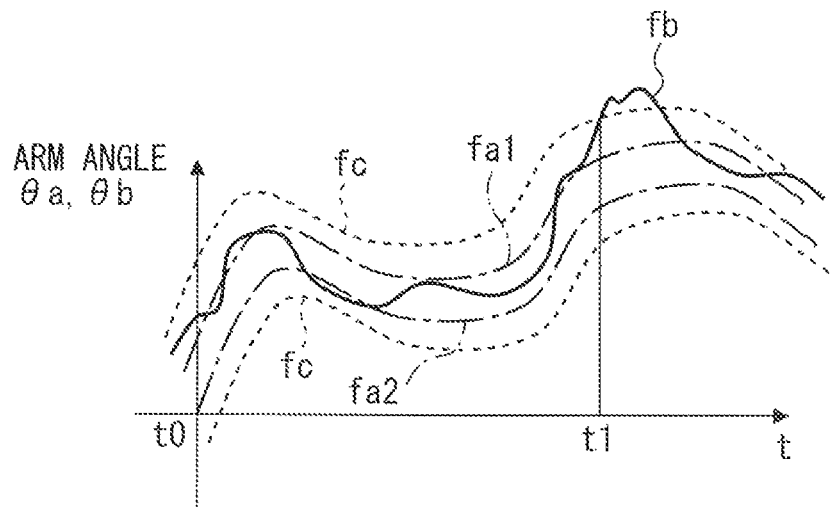
FIG. 7 is a graph illustrating an example of operational characteristics when two reference values are set.

FIG. 7 is a diagram illustrating an example in which characteristics fa1 and fa2 of two reference values a are set. The characteristics fa1 represent, for example, characteristics of a reference value α at high ambient temperature, whereas the characteristics fa2 represent, for example, characteristics of a reference value α at low ambient temperature. In FIG. 7, characteristics fc of threshold values, respectively, are set for the characteristics fa1 and fa2. When the value γ exceeds a predetermined value γs at the time point t1, it can be judged that there is an external force acting on the robot 100.

Assuming that the arm angle immediately changes due to a drive command from the motor control unit 21, a difference γ between the reference value α and a measured value β of the arm angle may be obtained. However, in general, a time lag occurs between the output of the drive command and the operation of the robot 100. The time lag depends on a weight of the robot 100, an arm length thereof, and the like. Then, in consideration of the time lag, the difference γ between the reference value α of arm angle and a measured value β thereof may be calculated using a measured value β after a passage of the time lag.

The external force judgment method according to the first embodiment can provide the following operational advantages:

(1) A reference value α of arm angle is acquired in advance under an assumption that the robot 100 is operated according to the control program Pr using a robot model corresponding to the robot 100 on which no external force is acting or on which a known external force is acting (step S1). After that, a measured value β of arm angle when the robot 100 is operated according to the same control program Pr is acquired (step S2). In addition, the magnitude of a difference γ between the reference value α and the measured value β is compared with the magnitude of a predetermined threshold value γs to judge the presence or absence of an external value acting on the robot 100 (step S3).

Therefore, even when a torque of the deceleration mechanism 13 nonlinearly changes due to backlash, hysteresis, viscosity, friction, or the like, the presence or absence of an external force acting on the robot 100 can be judged with high precision without any influence of the nonlinear change. In addition, since judgment as to the presence or absence of an external force is performed by the easy processing, the time required for the judgment is short. Accordingly, upon contact of a worker or an obstacle with the robot 100, the robot 100 can be immediately stopped, and it is possible to achieve high safety.

(2) Since the reference value α is calculated using the robot model, it is unnecessary to actually operate the robot 100 for acquisition of the reference value α, and thus it is possible to easily acquire the reference value α.

(3) Before operating the robot 100 according to the control program Pr, a reference value α of arm angle is calculated and stored in the memory unit 23 in advance. It is thus unnecessary to obtain the reference value α when the presence or absence of an external force is judged. Therefore, in order to judge the presence or absence of an external force, it is enough to merely calculate a difference γ between a reference value α and a measured value β and compare the magnitudes of the difference γ and a predetermined value γs, whereby the time required for the judgment can be shortened.

(4) When the robot 100 is in the stationary state, the presence or absence of an external force acting on the robot 100 is judged, and then when the presence of the external force is judged, operation of the robot 100 is controlled such that the external force is reduced (FIG. 6). This allows safe evasion from the robot 100 when a worker or an obstacle contacts with the robot 100.

Second Embodiment

A description will be given of an external force judgment method of a human-collaborative industrial robot according to a second embodiment of the present invention with reference to FIG. 8. The following description will be mainly made regarding the differences from the first embodiment.

The second embodiment differs from the first embodiment in terms of the method for acquiring a reference value α of arm angle (a reference value acquisition step). Specifically, while the first embodiment uses the robot model to acquire a reference value α by calculation, the second embodiment allows actual operation of the robot 100 to detect a reference value α.

Figure 8:
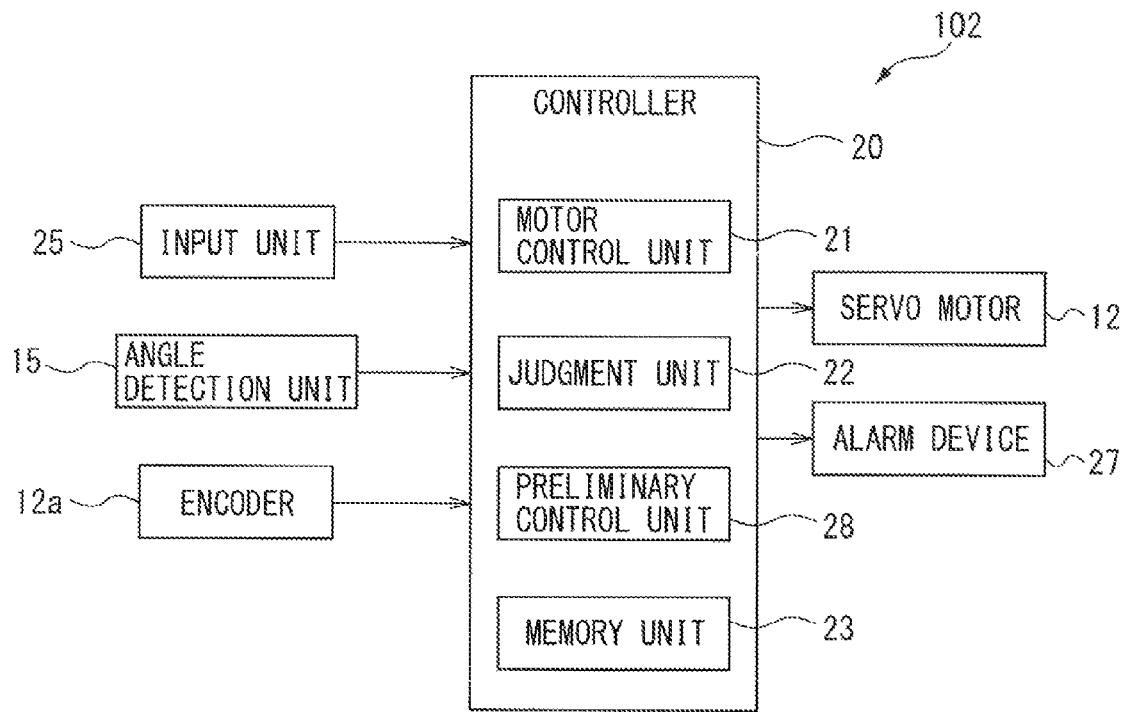
FIG. 8 is a block diagram illustrating a configuration of an external force judgment device according to a second embodiment of the invention.

FIG. 8 is a block diagram illustrating a configuration of an external force judgment device 102 according to the second embodiment of the present invention. The same reference signs are given to the same elements as those in FIG. 3. As illustrated in FIG. 8, the external force judgment device 102 does not include the simulation execution unit 26 and, instead, the controller 20 includes a preliminary control unit 28.

Before operating the robot 100 according to the control program Pr by a command from the motor control unit 21 to start work, the preliminary control unit 28 outputs a control signal to each servo motor 12 to operate the robot 100 (preliminary operation) according to the same control program Pr. The preliminary operation is executed in a state in which no external force is acting or a known external force is acting on the robot 100. At this time, the angle detection unit 15 detects arm angle and stores time-series data of the arm angle as a reference value α in the memory unit 23. The preliminary operation of the robot 100 is started when the input unit 25 inputs a preliminary operation start command.

The arm angle detected by the preliminary operation varies under the influence of noise, vibration of the robot 100, or the like. Accordingly, without directly using a detected value of the arm angle as the reference value α, the detected value may be smoothed by a low pass filter or the like and the smoothed value may be stored as the reference value α. Alternatively, after measuring an arm angle a plurality of times, an average of the measured values may be stored as the reference value α. When the detected value of arm angle varies due to backlash, hysteresis, viscosity, friction, or the like on the deceleration mechanism 13, the reference value α may be set in a certain range, considering the variation. When the detected value of arm angle varies due to ambient temperature of the robot 100, arm angles are measured under several temperature conditions and a plurality of reference values α may be set.

After the preliminary operation is ended, when the input unit 25 inputs the operation start command for the robot 100, the motor control unit 21 operates the robot 100 according to the control program Pr, similarly to the first embodiment. In this situation, the angle detection unit 15 detects a measured value β of arm angle, and then the judgment unit 22 calculates a difference γ between the measured value β and the reference value α and judges whether the value γ is larger than a predetermined value γs or not.

As described above, in the second embodiment, before starting operation, the robot 100 is operated in advance according to the control program Pr to detect an arm angle and sets the detected value as a reference value α. Thus, the reference value α and a measured value β correspond to each other favorably, so that the judgment of an external force can be made with high precision. In other words, a difference of arm angle can occur between individual robots depending on variation in machining, assembly, and the like, so that there may be a time lag between the output of an operational command for the robot 100 and the start of operation of the robot 100. Furthermore, arm angle shifting may occur due to backlash, hysteresis, viscosity, friction, or the like on the deceleration mechanism 13. In the second embodiment, since a detected value of arm angle including these uncertain factors is set as a reference value a, the reference value α can be set with high precision so as to correspond to a measured value β, and thus it is possible to increase the precision of judging an external force.

Third Embodiment

A description will be given of an external force judgment method of a human-collaborative industrial robot according to a third embodiment of the present invention with reference to FIGS. 9 to 12. The following description will be mainly made regarding the differences from the first embodiment.

The third embodiment differs from the first embodiment in terms of the structure of the robot 100 to which an external force judgment method is applied. In other words, while the first embodiment applies the external force judgment method to the robot 100 including the joint units 6 to 8, the third embodiment applies the method to a robot 200 including a linear motion unit.

Figure 9:
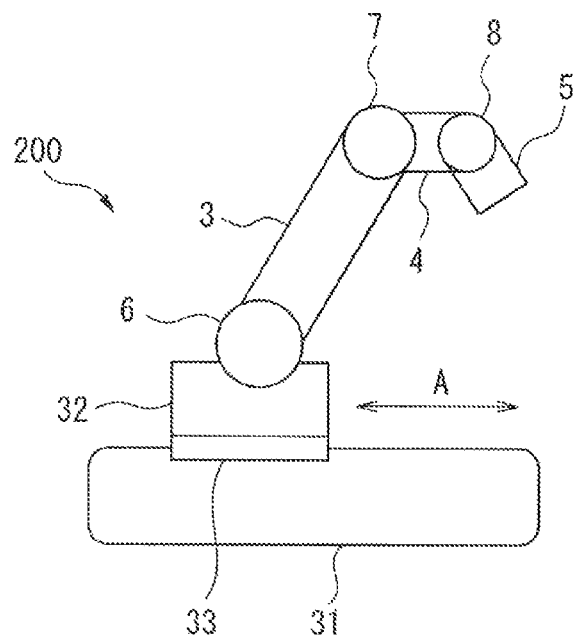
FIG. 9 is a side view illustrating a schematic structure of a human-collaborative industrial robot according to a third embodiment of the invention.

FIG. 9 is a side view illustrating a schematic structure of the human-collaborative industrial robot 200 according to the third embodiment of the invention. The same reference signs are given to the same elements as those in FIG. 1. As illustrated in FIG. 9, the robot 200 according to the third embodiment includes a first base unit 31, a second base unit 32, the lower arm 3, the upper arm 4, and the wrist unit 5. The second base unit 32 is mounted on an upper surface of the first base unit 31 linear-movably (slidably) in an arrow A direction through the linear motion unit 33.

Figure 10:
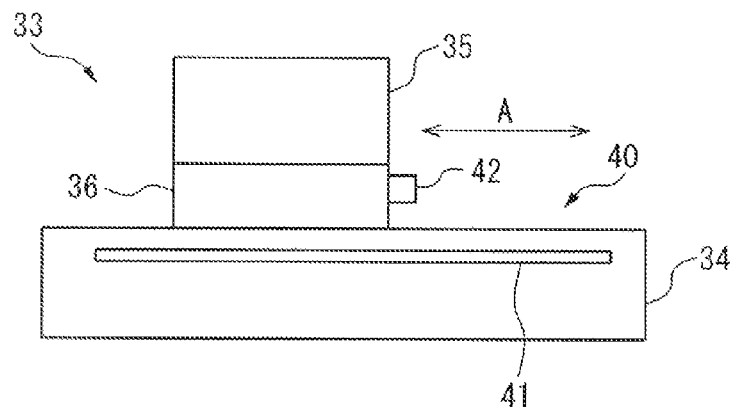
FIG. 10 is a diagram illustrating a structure of a linear motion unit in FIG. 9.

FIG. 10 is a diagram illustrating a structure of the linear motion unit 33. As illustrated in FIG. 10, the linear motion unit 33 includes a fixed unit 34 fixed to the first base unit 31 and a movable unit 35 fixed to the second base unit 32 and linearly moving in the arrow A direction relatively with respect to the fixed unit 34. The movable unit 35 is provided with a deceleration mechanism 36. The movable unit 35 is connected to the fixed unit 34 through a power conversion mechanism and the deceleration mechanism 36.

The power conversion mechanism includes a servo motor, a ball screw, and a nut and converts rotational movement of the servo motor to translatory movement through the ball screw and the nut. The power conversion mechanism may also be formed by a combination of a tire and a rail, a rack and a pinion, or the like. Using a belt-driven system, rotational movement may be converted to translatory movement. The deceleration mechanism 36 decelerates a moving speed of the second base unit 35 to increase a torque.

The linear motion unit 33 is provided with a position detection unit 40 for detecting a relative position of the second base unit 32 (hereinafter referred to as "base unit position") with respect to the first base unit 31. The position detection unit 40 includes a detected unit and a detection unit. The detected unit is composed of a scale 41 provided on an upper surface of the fixed unit 34, and the detection unit is composed of a detection head 42 provided on the movable unit 35 (an output side of the deceleration mechanism 36) in such a manner as to face the scale 41. Scale marks are formed on the scale 41 at a narrow pitch. The detection head 42 applies a laser beam to the scale 41, receives reflection light reflected on the scale 41, and detects a base unit position based on a strength or weakness of the light. The scale 41 may be arranged on the movable unit 35, and the detection head 42 may be arranged on the fixed unit 34. In other words, the scale 41 and the detection head 42 may be arranged at positions different from those in FIG. 10 as long as one of the scale 41 and the detection head 42 is arranged on the fixed unit 34 or a part that does not relatively move with respect to the fixed unit 34 and the other of the scale 41 and the detection head 42 is arranged on the movable unit 35 or a part that does not relatively move with respect to the movable unit 35.

Figure 11:
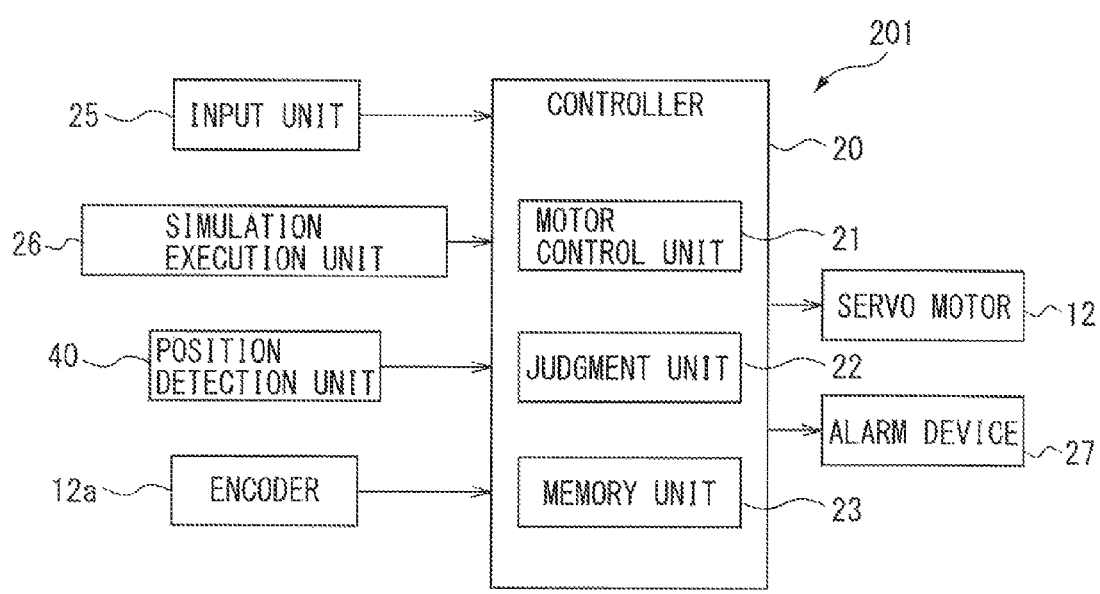
FIG. 11 is a block diagram illustrating a configuration of an external force judgment device according to the third embodiment of the invention.

FIG. 11 is a block diagram illustrating a configuration of an external force judgment device 201 according to the third embodiment of the invention. The same reference signs are given to the same elements as those in FIG. 3. As illustrated in FIG. 11, the controller 20 is connected to the position detection unit 40 instead of the angle detection unit 15 (FIG. 3), whereby a signal from the position detection unit 40 is input to the controller 20. The servo motor 12 includes a plurality of servo motors provided on the linear motion unit 33 and the respective joint units 6 to 8.

The method of the third embodiment uses base unit position instead of arm angle to judge the presence or absence of an external force acting on the robot 200. Except for this, the external force judgment method of the third embodiment is the same as that of the first embodiment (FIG. 4). In other words, first, the simulation execution unit 26 executes a simulation calculation according to the control program Pr, using a robot model corresponding to the robot 200 on which no external force is acting or on which a known external force is acting to calculate a reference value $\alpha$ of base unit position (a reference value acquisition step).

Next, the position detection unit 40 detects a measured value $\beta$ of the base unit position when the robot 200 is operated by a control signal from the motor control unit 21 according to the control program Pr (a measured value acquisition step).

Furthermore, during the operation of the robot 200 by the control signal from the motor control unit 21, the judgment unit 22 calculates a difference $\gamma$ between the reference value $\alpha$ of the base unit position and the measured value $\beta$ thereof and compares a magnitude of the difference $\gamma$ with a magnitude of a predetermined value $\gamma s$ to judge the presence or absence of an external force acting on the robot 200 (a judgment step).

Therefore, even when a torque of the deceleration mechanism 36 nonlinearly changes due to backlash, hysteresis, viscosity, friction, and the like, the presence or absence of an external force acting on the robot 200 can be judged with high precision without any influence of the nonlinear change. In addition, since the presence or absence of an external force is judged by the easy processing, the time required for the judgment is short. Thus, upon contact of a worker or an obstacle with the robot 200, the robot 200 can be immediately stopped, achieving high safety.

Figure 12:
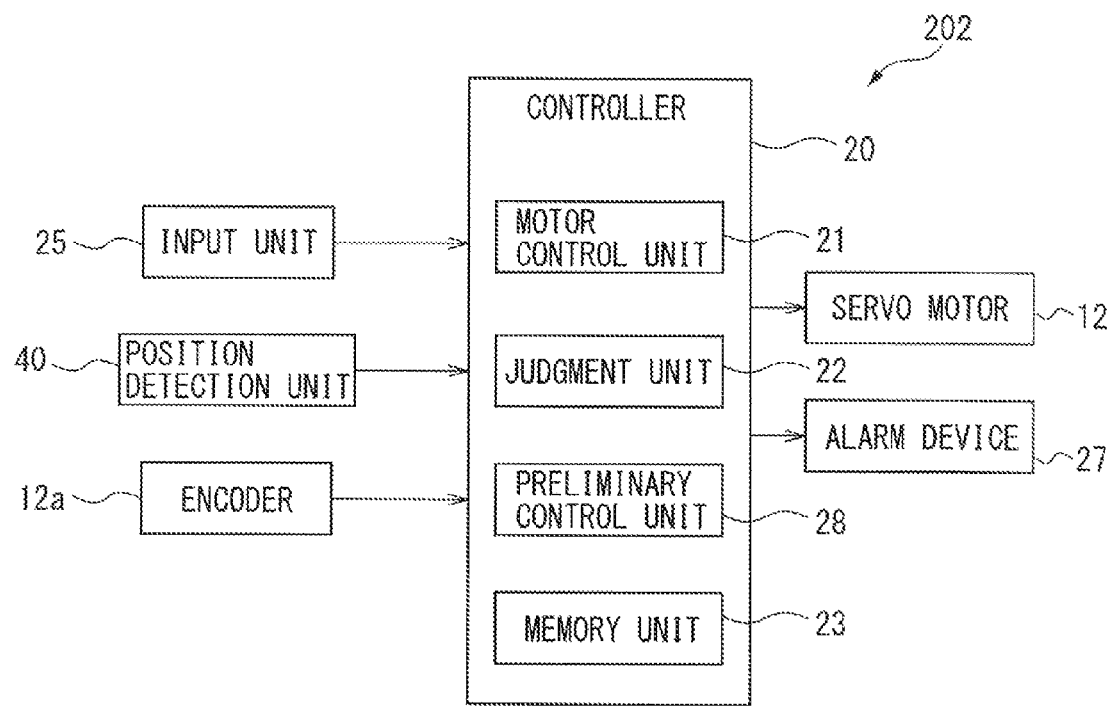
FIG. 12 is a diagram illustrating a modified example of the configuration of FIG. 11.

In the third embodiment, the reference value $\alpha$ is acquired by calculation using the robot model. However, similarly to the second embodiment, actual operation of the robot 200 may allow for the detection of the reference value $\alpha$. FIG. 12 is a block diagram illustrating a configuration of an external force judgment device 202 in that case. The same reference signs are given to the same elements as those in FIG. 8. As compared to FIG. 11, the external force judgment device 202 of FIG. 12 does not include the simulation execution unit 26 and, instead, the controller 20 includes the preliminary control unit 28.

Processing by the preliminary control unit 28 is the same as that in the second embodiment except for detection of a base unit position by the position detection unit 40 instead of arm angle. In other words, before operating the robot 200 according to the control program Pr by a command from the motor control unit 21, the preliminary control unit 28 outputs a control signal according to the same control program Pr to each servo motor 12 to operate the robot 200 (preliminary operation). The preliminary operation is executed in a state in which no external force is acting or a known external force is acting on the robot 200. At this time, the position detection unit 40 detects a base unit position and stores time-series data of the base unit position as a reference value $\alpha$ in the memory unit 23.

In the first and the second embodiments, the external force judgment method is applied to the robot 100 including the joint units 6 to 8 (FIG. 1). In the third embodiment, the external force judgment method is applied to the robot 200 including the linear motion unit 33 (FIG. 9). However, the present invention can also be applied to various robots as long as the robots include the first member (the pivoting unit 2 or the first base unit 31) and the second member (the lower arm 3 or the second base unit 32) movably connected to the first member through the deceleration mechanism 13 or 36.

Figure 13:
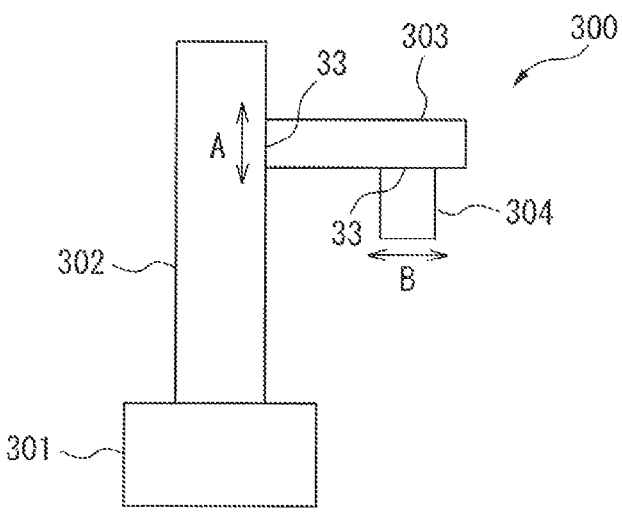
FIG. 13 is a diagram illustrating a modified example of the structures of FIGS. 1 and 9.
Figure 14:
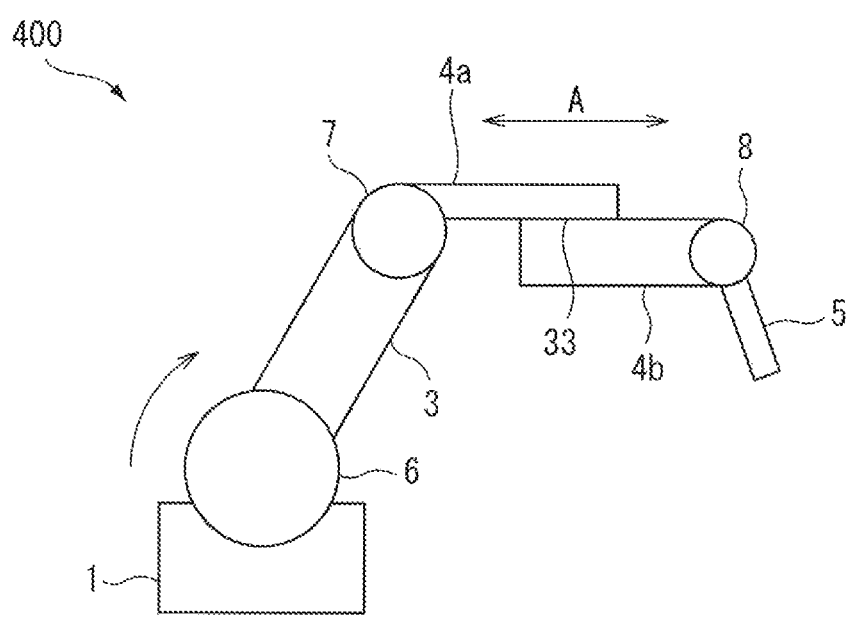
FIG. 14 is a diagram illustrating another modified example of the structures of FIGS. 1 and 9.

FIGS. 13 and 14 illustrate other exemplary robots to which the present invention is applied. A robot 300 illustrated in FIG. 13 includes a base unit 301, a column 302 arranged in a standing manner on the base unit 301, an arm 303 which moves in an arrow A direction along the column 302 through the linear motion unit 33, and a head 304 which moves in an arrow B direction along the arm 303 through the linear motion unit 33. A robot 400 illustrated in FIG. 14 includes the lower arm 3 rotatably supported to the base unit 1 through the joint unit 6, a first upper arm 4a rotatably supported to the lower arm 3 through the joint unit 7, a second upper arm 4b linear-movably supported to the first upper arm 4a through the linear motion unit 33, and the wrist unit 5 rotatably supported to the second upper arm 4b through the joint unit 8.

In each of the above embodiments, the position detection unit 40 or the angle detection unit 15 acquires a reference value $\alpha$ of base unit position or arm angle when the robot 100 or 200 on which no external force is acting or on which a known external force is acting is operated by a predetermined command (the control program Pr) in advance. Alternatively, the simulation execution unit 26 acquires, by calculation, a reference value $\alpha$ of base unit position or arm angle when it is assumed that the robot 100 or 200 on which no external force is acting or on which a known external force is acting is operated by the predetermined command in advance. However, the configuration of the reference value acquisition unit for acquiring a reference value of the relative position or angle of the second member with respect to the first member is not limited to the configuration described above.

The configuration of the measured value acquisition unit is not limited to the angle detection unit 15 and the position detection unit 40 described above as long as the measured value acquisition unit acquires a base unit position, an arm angle, and the like when the robots 100 and 200 are operated by the same command (the control program Pr) as that used to acquire the reference value $\alpha$. The embodiments described above compare the magnitude of a difference $\gamma$ between a reference value $\alpha$ and a measured value $\beta$ with the magnitude of a predetermined threshold value $\gamma s$ to judge the presence or absence of an external force acting on the robots 100 and 200. However, the configuration of the judgment unit 22 can be any configuration as long as the presence or absence of an external force acting on the robot is judged based on the difference value $\gamma$ and the threshold value $\gamma s$.

Although the threshold value $\gamma s$ is determined in advance in order to judge the presence or absence of an external force, the threshold value $\gamma s$ may be either a constant value or a variable value. When the threshold value is a variable value, the threshold value $\gamma s$ can be changed according to a posture of the robot 100 or 200. For example, when the robot is in a posture of extending an arm (the arm angle is large), the swing of the arm is large and thus it is enough to set a large threshold value. Conversely, when the robot is in a posture of drawing the arm close to itself (the arm angle is small), the swing of the arm is small and thus it is enough to set a small threshold value. The threshold value $\gamma s$ may be changed depending on the ambient environment of the robot 100 or 200. For example, when a variation in values detected by the detection unit becomes larger due to increase in the ambient temperature, the threshold value $\gamma s$ may be increased when the ambient temperature exceeds a predetermined temperature so as to prevent an erroneous detection in judgment of an external force. Magnitudes of an upper limit value and a lower limit value of the threshold value $\gamma s$ may be different from each other.

It is possible to arbitrarily combine any of the embodiments with one or more of the modified examples.

The present invention acquires, in advance, the reference value of a position or an angle of the robot on which no external force is acting or a known external force is acting, and then judges the presence or absence of an external force acting on the robot based on a difference between the reference value and a measured value of the position or the angle when the robot is operated and a threshold value. Accordingly, even when the torque of the deceleration mechanism nonlinearly changes, the presence or absence of an external force acting on the robot can be judged with high precision.

While the present invention has been described above in connection with some preferred embodiments thereof, it will be understood by those skilled in the art that various changes and modifications can be made without departing from the scope disclosed in the claims described below.

The invention claimed is:

1. An external force judgment method for judging a presence or absence of an external force acting on a robot including a first member and a second member movably connected to the first member through a deceleration mechanism, the method comprising:
   a reference value acquisition step of acquiring a reference value of a relative position or angle of the second member with respect to the first member when the robot on which no external force is acting or on which a known external force is acting is assumed to be operated or is operated by a predetermined command in advance;
   a measured value acquisition step of acquiring a measured value of a relative position or angle of the second member with respect to the first member when the robot is operated by the predetermined command, wherein, one of a detection unit and a detected unit paired with the detection unit is arranged on the first member or a part not relatively moving with respect to the first member, whereas another of the detection unit and the detected unit is arranged on the second member or a part not relatively moving with respect to the second member, and a value detected by the detection unit is the measured value; and
   a judgment step of judging the presence or absence of an external force acting on the robot based on a difference between the reference value acquired by the reference value acquisition step and the measured value acquired by the measured value acquisition step and a predetermined threshold value.

2. The external force judgment method according to claim 1, wherein the reference value acquisition step includes acquiring the reference value based on the value detected by the detection unit when one of the detection unit and the detected unit paired with the detection unit is arranged on the first member or the part not relatively moving with respect to the first member, whereas the other of the detection unit and the detected unit is arranged on the second member or the part not relatively moving with respect to the second member.

3. The external force judgment method according to claim 1, wherein the reference value acquisition step includes calculating the reference value using a robot model corresponding to the robot on which no external force is acting or on which a known external force is acting.

4. The external force judgment method according to claim 1, wherein the reference value acquisition step includes detecting the reference value detected by operating the robot on which no external force is acting or on which a known external force is acting by the predetermined command.

5. The external force judgment method according to claim 1, wherein
the second member is rotatably connected to the first member, and
the reference value acquisition step and the measured value acquisition step include acquiring the relative angle of the second member with respect to the first member.

6. The external force judgment method according to claim 1, wherein
the second member is linear-movably connected to the first member, and
the reference value acquisition step and the measured value acquisition step includes acquiring the relative position of the second member with respect to the first member.

7. The external force judgment method according to claim 1, wherein the predetermined command is a stop command for the robot.

8. An external force judgment device for judging a presence or absence of an external force acting on a robot including a first member and a second member movably connected to the first member through a deceleration mechanism, the device comprising:
a reference value acquisition unit for acquiring a reference value of a relative position or angle of the second member with respect to the first member when the robot on which no external force is acting or on which a known external force is acting is assumed to be operated or is operated by a predetermined command in advance;
a measured value acquisition unit for acquiring a measured value of the relative position or angle of the second member with respect to the first member when the robot is operated by the predetermined command, the measured value acquisition unit including a detection unit and a detected unit paired with the detection unit, wherein, one of the detection unit and the detected unit is arranged on the first member or a part not relatively moving with respect to the first member, whereas another of the detection unit and the detected unit is arranged on the second member or a part not relatively moving with respect to the second member, and a value detected by the detection unit is the measured value; and
a judgment unit for judging the presence or absence of an external force acting on the robot based on a difference between the reference value acquired by the reference value acquisition unit and the measured value acquired by the measured value acquisition unit and a predetermined threshold value.

* * * * *